Dec. 21, 1965   R. H. ELLIOTT   3,224,566

SPLICED BELTING

Filed April 12, 1962

INVENTOR.
Robert H. Elliott
BY Kenway, Jenney & Hildreth
Attys.

United States Patent Office 3,224,566
Patented Dec. 21, 1965

3,224,566
SPLICED BELTING
Robert H. Elliott, Lincoln, Mass., assignor to American Biltrite Rubber Co., Inc., Chelsea, Mass., a corporation of Delaware
Filed Apr. 12, 1962, Ser. No. 186,905
5 Claims. (Cl. 198—193)

This invention comprises a new and improved belting of such construction that it may be conveniently and securely spliced in the field or on the job away from its source of production.

In installing conveyor belting it is usually necessary to splice the belting at the site where it is to be used. It is of great importance that the splice should be strong, of uniform thickness with the belt and free from all surface irregularities that would result in undesirable surface wear.

The belting of this invention comprises two or more plies of textile material having an internal or intermediate layer of elastomeric material between adjacent plies, the elastomeric layer being substantially the same thickness as the textile plies and firmly bonded thereto. In the splicing operation a section of this intermediate layer may be removed and its space utilized to contain an adhesively coated insert sheet of strong textile material.

As herein shown the belting includes in its structure cover plies of rubber or plastic composition and in forming my improved splice these plies are severed and butt joined in locations spaced longitudinally of the belting. In forming the splice the section removed from the intermediate layer spans the joints of the cover plies and the inserted reinforcing sheet is so located as to impart its full strength to the plies and to more than compensate for the removed section of the intermediate elastomeric layer.

Figure 1:
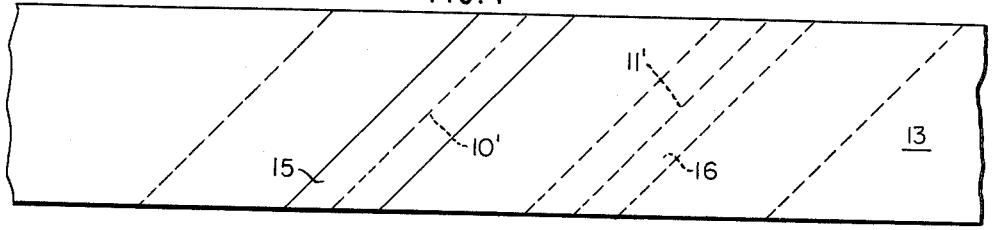
Figure 2:
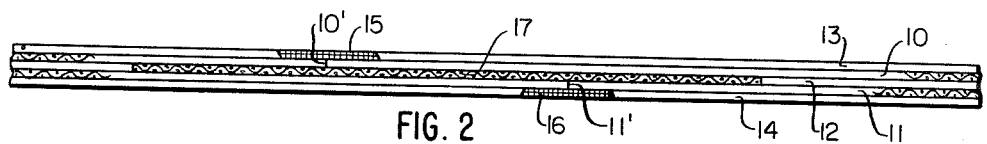
Figure 3:
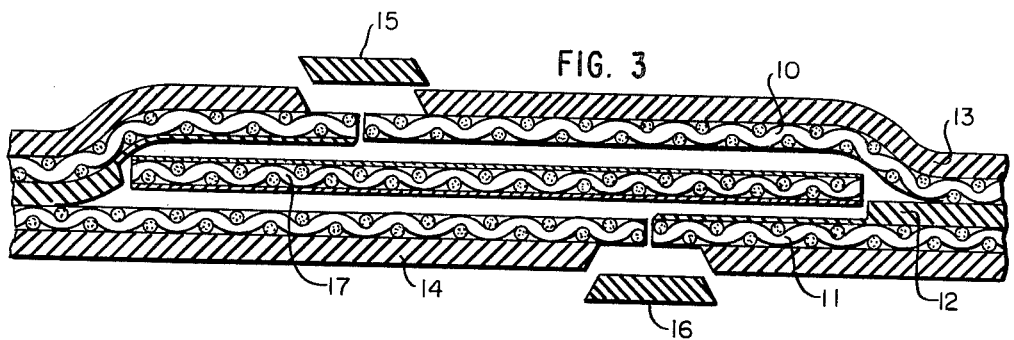
Figure 4:
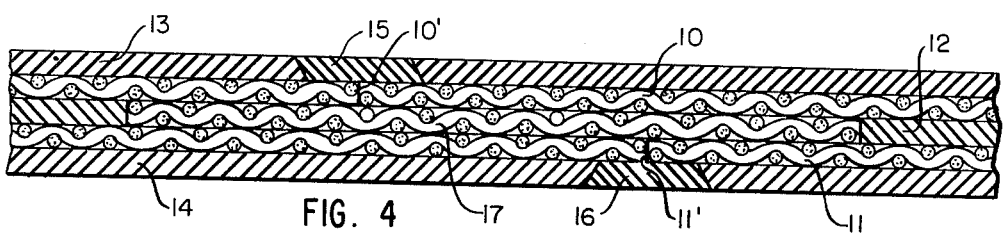

These and other features of the invention will be best understood and appreciated from the following description of a preferred embodiment thereof selected for purposes of illustration and shown in the accompanying drawings in which:

FIG. 1 is a plan view of a piece of the belting in which the splice is included, FIG. 2 is a corresponding longitudinal section, FIG. 3 is a view in a longitudinal section of parts of the belt assembled for splicing shown on an enlarged scale, and FIG. 4 is a longitudinal section on the same scale of the spliced belt.

As herein shown the belting is constructed of five layers or plies which are united in continuous face to face contact by being cured or vulcanized under conditions of heat and pressure and so transformed into a tough, flexible, integral unit.

Tensile strength is imparted to the belting by two carcass plies 10 and 11 and these may comprise sheets of strong, tough textile fabric, such as duck, coated with adhesive and impregnated with rubber or synthetic resin. Between the carcass plies 10 and 11 is interposed a layer 12 of rubber composition or other elastomeric material and this layer is bonded by vulcanization or adhesive to and between the carcass layers 10 and 11. The belting is completed by outer cover plies 13 and 14 which may be of rubber composition or synthetic resin according to the purpose for which the conveyor belt is intended. The belting thus far described is novel in itself, being strong, flexible and having long life in wear under exacting conditions. It has the additional advantage of being particularly well adapted for splicing and its range of usefulness is thus substantially extended.

In splicing the belting above described the various plies are cut on a bias as suggested in FIG. 1 and the intermediate elastomeric layer 12 is exposed so that a section may be cut therefrom and removed. As shown in FIG. 3 the layer 12 may be cut away or reduced to provide a space perhaps 18 inches long in which the elastomeric material is wholly or partially removed and space provided for the insertion of a reinforcing piece 17 of rubberized textile material of the same or substantially the same character as that of the carcass plies 10 and 11. As herein shown the right hand end of the ply 12 is cut with a projecting lap at its lower edge and at its left hand end with a projecting lap at its upper edge.

The carcass plies 10 and 11 are cut off on a bias to form butt joints 10' or 11' spaced from each other longitudinally of the belting and within the span of the reinforcing ply 17. Similarly the outer cover plies 13 and 14 are cut off on a bias to receive inserts 15 and 16 in spaces provided for them above the butt joints 10' and 11' of the carcass plies. As herein shown the edges of the inserts 15 and 16 may be beveled or undercut to make flush joints in the surface of the cover plies 13 and 14. The inserts are used because it is more convenient to manipulate and fit them in place than to match directly the cover plies which are long and cumbersome to handle. Having assembled these parts as shown in FIG. 3 and having coated or applied suitable adhesive thereto, they are consolidated under pressure and heat to produce in the spliced belting the smoothly bonded plies as indicated in FIG. 4.

While the reinforcing insert 17 may be of rubberized duck or the like it has been found advantageous to employ a woven textile having a polyester warp, such as "Dacron," and a polyamide filling, such as "nylon," in cases where maximum strength is required in limited space.

Having thus disclosed my invention and described an illustrative embodiment thereof I claim as new and desire to secure by Letters Patent:

1. Conveyor belting comprising at least two carcass plies of textile material and an intermediate layer of elastomeric sheet material located between adjacent plies of the textile material, the said elastomeric layer being of substantially the same thickness as the textile plies and adhesively bonded thereto, and outer cover plies of rubbery compound enclosing the textile plies, the said belting having a spliced area in which the carcass plies are severed and have butt joints at longitudinally spaced locations in the belt and at different levels therein, and an insert of adhesively coated textile material of the same physical properties as the said carcass plies overlaps and strengthens the butt joints and replaces a corresponding volume and area provided by the removal of a section of said intermediate elastomeric layer.

2. In conveyor belting comprising at least two carcass plies of textile material, an intermediate elastomeric ply, and outer plies of rubber covering the carcass plies; a spliced area in which severed carcass plies have butt joints at longitudinally spaced locations in the belting, and a single reinforcing insert of strong adhesively coated textile material overlaps said butt joints and replaces a corresponding area and volume provided by removal of a section of said elastomeric ply between adjacent carcass plies.

3. In conveyor belting; a splice as described in claim 2, further characterized in that the said reinforcing insert is a woven textile having a polyester warp and a polyamide filling.

4. In conveyor belting, a splice as described in claim 2, further characterized in that the said reinforcing insert is of greater length than the distance between adjacent butt joints in the carcass plies.

5. In conveyor belting; a splice as described in claim 2, further characterized in that the outer cover plies of rubber are butted on opposite sides of inserts of the same material, the said inserts spanning the butt joints of the carcass plies located within the cover plies.

References Cited by the Examiner

UNITED STATES PATENTS

| | | | |
|---|---|---|---|
| 1,352,739 | 9/1920 | Egerton | 74—231 |
| 2,079,965 | 5/1937 | Reimel | 74—232 |
| 2,121,650 | 6/1938 | Berman et al. | 74—231 XR |
| 2,801,452 | 8/1957 | Adams | 24—38 |

FOREIGN PATENTS 33,753  10/1924  Denmark.

ALEXANDER WYMAN, *Primary Examiner.*

EARL M. BERGERT, *Examiner.*